(12) United States Patent
Onuma et al.

(10) Patent No.: US 7,764,389 B2
(45) Date of Patent: Jul. 27, 2010

(54) APPARATUS AND METHOD FOR CONTROLLING RECORDING AND SHEET CONVEYING BASED ON RECORDING SCANS AND SHEET POSITION

(75) Inventors: Kentaro Onuma, Yokohama (JP); Haruyuki Yanagi, Machida (JP); Tetsuya Ishikawa, Yokohama (JP); Minoru Teshigawara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 524 days.

(21) Appl. No.: 11/837,377

(22) Filed: Aug. 10, 2007

(65) Prior Publication Data

US 2008/0049272 A1 Feb. 28, 2008

(30) Foreign Application Priority Data

Aug. 23, 2006 (JP) ............................. 2006-226701

(51) Int. Cl.
*G06K 15/16* (2006.01)
*H04N 1/034* (2006.01)
*H04N 1/23* (2006.01)
*B41J 2/01* (2006.01)
*B41J 13/02* (2006.01)

(52) U.S. Cl. .................... 358/1.12; 358/504; 358/296; 347/12; 347/16; 347/104

(58) Field of Classification Search ............... 358/1.12, 358/504, 296, 488, 498; 347/12, 14, 16, 347/101, 104
See application file for complete search history.

(56) References Cited

U.S. PATENT DOCUMENTS

| 6,231,159 | B1 * | 5/2001 | Taniguro .................... 347/104 |
| 2004/0183846 | A1 | 9/2004 | Kunihiro | |
| 2007/0176955 | A1 * | 8/2007 | Yoshida ........................ 347/16 |

FOREIGN PATENT DOCUMENTS

JP 2004-230817 A 8/2004

* cited by examiner

*Primary Examiner*—Scott A Rogers
(74) *Attorney, Agent, or Firm*—Canon U.S.A.., Inc., IP Division

(57) ABSTRACT

A recording apparatus for forming images using a recording head includes a feeding roller, a conveying roller, a conveyance control unit, and a recording control unit. The conveyance control unit performs a conveying operation a number of times after the trailing end of a sheet reaches a predetermined position defined between the feeding roller and the conveying roller such that the trailing end of the sheet is disposed in a predetermined range upstream of the conveying roller in a sheet conveying direction after the conveying operations. At least one of the conveying operations performed a number of times is performed based on a distance from the position of the trailing end of the sheet to the position of the conveying roller.

4 Claims, 11 Drawing Sheets

US 7,764,389 B2

APPARATUS AND METHOD FOR CONTROLLING RECORDING AND SHEET CONVEYING BASED ON RECORDING SCANS AND SHEET POSITION

BACKGROUND OF THE INVENTION

1. Field of the Invention

The present invention relates to recording apparatuses (e.g., ink-jet recording apparatuses) for recording (e.g., forming images) using recording heads, and relates to methods for controlling the apparatuses.

2. Description of the Related Art

Mechanisms such as ink-jet recording apparatuses that convey sheets usually include line feed (LF) rollers (conveying rollers) and eject rollers. When the mechanisms convey sheets, the LF rollers are used as main conveying units and the eject rollers are used as auxiliary conveying units.

The LF rollers are disposed upstream in a direction in which sheets are conveyed (conveying direction), and the eject rollers are disposed downstream in the conveying direction. Recording heads scan over areas between the LF rollers and the eject rollers. Therefore, areas corresponding to areas scanned by the recording heads while the sheets are engaged by the LF rollers and the eject rollers are referred to as "recording areas".

Furthermore, areas corresponding to areas scanned by the recording heads while the sheets are engaged by only the eject rollers are also referred to as "recording areas". That is, a recording is also made in areas adjacent to the trailing ends of the sheets.

In order to make up for a reduction in conveying accuracy during recording of the trailing ends of the sheets, a technology described in Japanese Patent Laid-Open No. 2004-230817 reduces the number of nozzles of a recording head to be used and the conveying amount of a sheet per scan when a recording is made in areas adjacent to the trailing ends of the sheet.

FIG. 9 illustrates the positional relationship among a conveying roller 136, a pinch roller 137, and the trailing end of a sheet. In FIG. 9, the sheet is fed from right to left. Each arrow indicates a conveying operation. The end points of the arrows indicate the positions of the trailing end of the sheet after the conveying operations, and the start points of the arrows indicate the positions of the trailing end of the sheet before the conveying operations. An area between A and B shown in FIG. 9 is referred to as an "unstable stop area" where the position of the trailing end of a sheet that has stopped in this area is not stabilized. FIG. 9 illustrates two types of conveying sequences. In Sequence (1), the sheet is conveyed by a conveying amount of P/8 in areas other than the unstable stop area. Furthermore, in Sequence (1), the sheet is conveyed by a conveying amount of 3P/8 such that the trailing end of the sheet does not stop in the unstable stop area. In Sequence (2), the sheet is conveyed by a conveying amount of P/8 in all areas. In this case, the trailing end of the sheet stops in the unstable stop area two times.

In Sequence (1), the conveying amount per conveying operation is small. This leads to increases in the number of times scanning is performed by the recording head and in the number of conveying operations, resulting in a reduction in throughput in recording operations.

In Sequence (2), the trailing end of the sheet stops in the unstable stop area two times. Therefore, the conveying amount in the unstable stop area becomes different from that in areas other than the unstable stop area, resulting in a reduction in image quality.

SUMMARY OF THE INVENTION

An embodiment of the present invention is directed to a recording apparatus capable of stopping the trailing end of a sheet in a predetermined range when the trailing end of the sheet passes through a conveying roller during recording.

According to an aspect of the present invention, an embodiment is directed to a recording apparatus for forming images using a recording head scanning over a predetermined area on a sheet N times. The recording apparatus includes a feeding roller configured to convey the sheet disposed on a stacking unit; a conveying roller configured to further convey the sheet fed by the feeding roller; a conveyance control unit configured to control drive of the conveying roller each time scanning is performed by the recording head; and a recording control unit configured to control a first recording in which the scanning is performed N times by selecting recording elements of the recording head until a trailing end of the sheet reaches a predetermined position defined between the feeding roller and the conveying roller, and configured to control a second recording in which the scanning is performed N times using a part of the recording elements of the recording head after the trailing end of the sheet reaches the predetermined position. The conveyance control unit performs a conveying operation a number of times based on the value of N after the trailing end of the sheet reaches the predetermined position such that the trailing end of the sheet is disposed in a first range remote from and upstream of the conveying roller in a direction in which the sheet is conveyed after the conveying operations. At least one of the conveying operations performed a number of times based on the value of N is performed based on a distance from a position of the trailing end of the sheet to the position of the conveying roller.

According to another aspect of the present invention, an embodiment is directed to a method for controlling a recording apparatus for forming images using a recording head scanning over a predetermined area on a sheet N times. The recording apparatus includes a feeding roller configured to convey the sheet disposed on a stacking unit and a conveying roller configured to further convey the sheet fed by the feeding roller. The method includes controlling drive of the conveying roller each time scanning is performed by the recording head; and controlling a first recording in which the scanning is performed N times by selecting recording elements of the recording head until a trailing end of the sheet reaches a predetermined position defined between the feeding roller and the conveying roller, and controlling a second recording in which the scanning is performed N times using a part of the recording elements of the recording head after the trailing end of the sheet reaches the predetermined position. The drive of the conveying roller is controlled so as to perform a conveying operation a number of times based on the value of N after the trailing end of the sheet reaches the predetermined position such that the trailing end of the sheet is disposed in a first range including the position of the conveying roller and upstream of the conveying roller in a direction in which the sheet is conveyed after the conveying operations. At least one of the conveying operations performed a number of times based on the value of N is performed based on a distance from a position of the trailing end of the sheet to the position of the conveying roller.

Further features of the present invention will become apparent from the following description of exemplary embodiments with reference to the attached drawings.

DESCRIPTION OF THE EMBODIMENTS

An exemplary embodiment of the present invention will now be described in detail with reference to the drawings.

Figure 1:
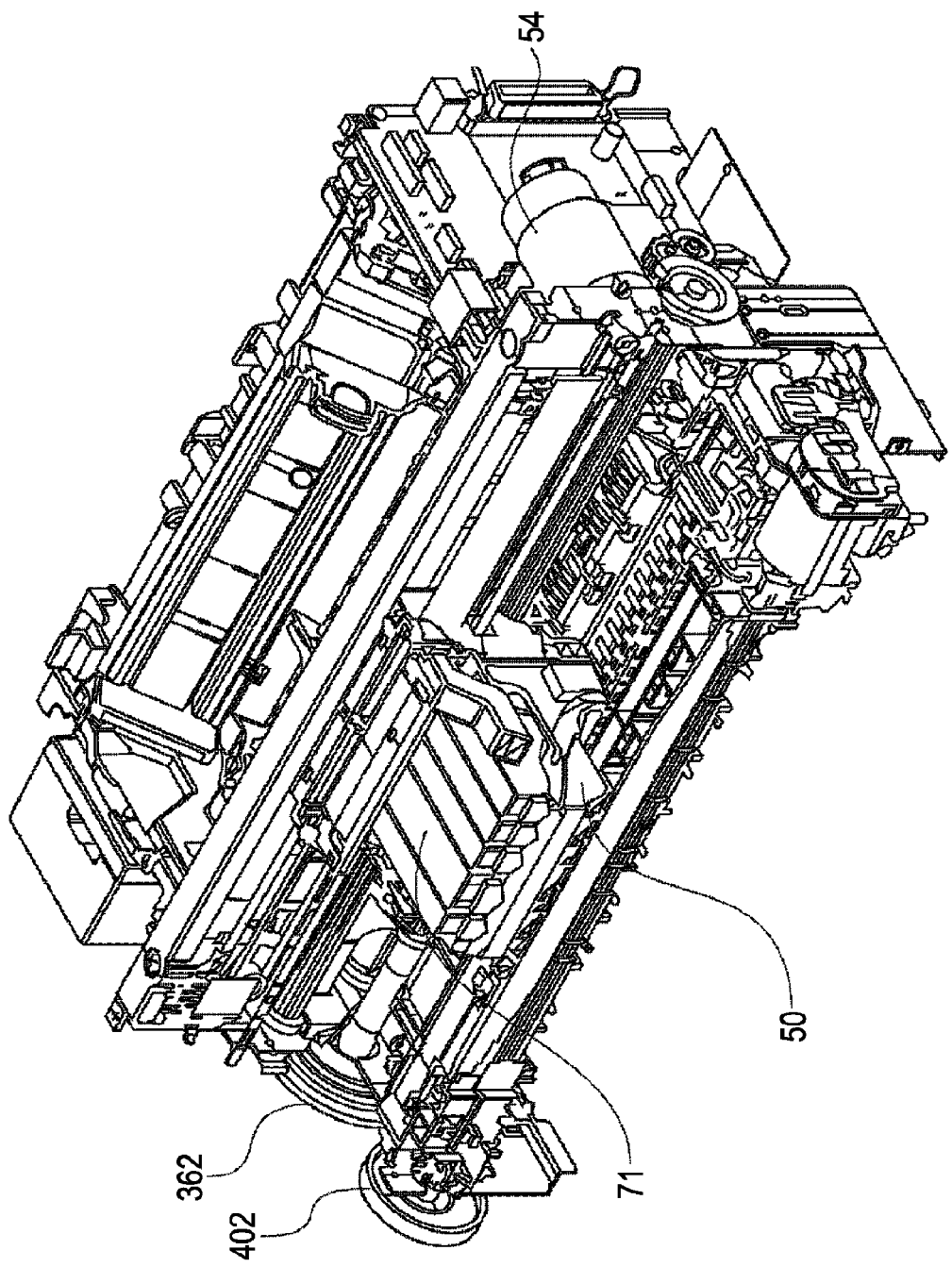
FIG. 1 is a perspective view of a recording apparatus according to an embodiment of the present invention.

FIG. 1 is a perspective view of a recording apparatus (inkjet recording apparatus) for making a recording (e.g., forming images) on sheets (recording media) by using a recording head 71 in a main scanning direction. The recording head 71 is installed in a carriage 50. A carriage motor 54 drives the carriage 50 to scan. The recording apparatus also includes conveying mechanisms for conveying the sheets in a sub scanning direction (described below).

The recording apparatus forms images on sheets by, for example, repeating conveyance of the sheets by a predetermined conveying amount and scanning performed by the carriage having the recording head installed therein.

Figure 2:
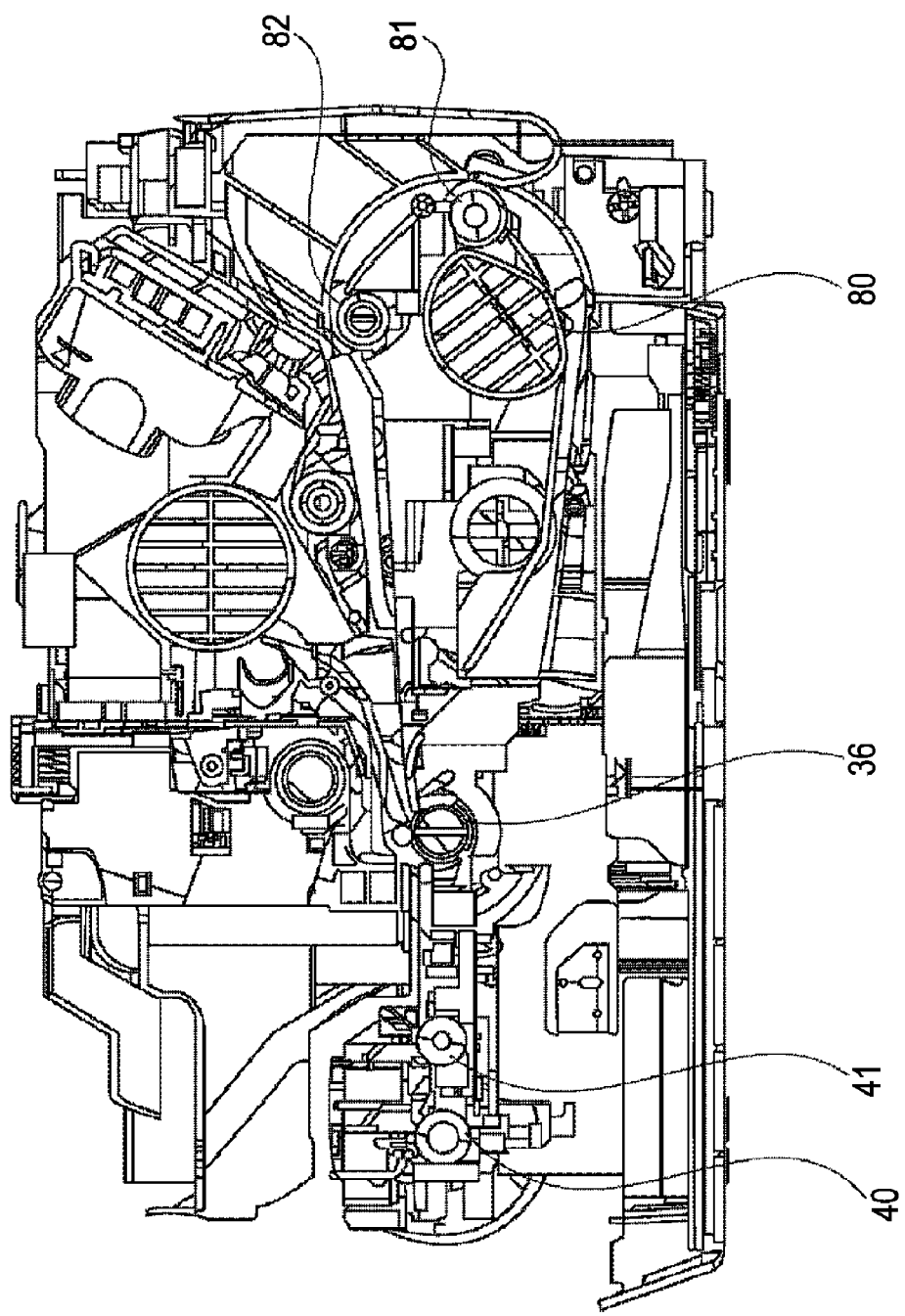
FIG. 2 is a cross-sectional view of the recording apparatus according to an embodiment of the present invention.

FIG. 2 is a cross-sectional view of the recording apparatus. The recording apparatus includes a conveying roller 36, eject rollers 40 and 41, and a feeding roller 80. The feeding roller 80 picks up a sheet from a paper feeding tray disposed in a lower portion of the apparatus. The sheet picked up by the feeding roller 80 is conveyed to the conveying roller 36 via a first intermediate roller 81 and a second intermediate roller 82. The conveying path during these operations is U-shaped when viewed in section as shown in FIG. 2. The sheet is further conveyed by the conveying roller 36 and the eject rollers. An image is formed on the sheet in an area between the conveying roller 36 and the eject roller 40.

Figure 3:
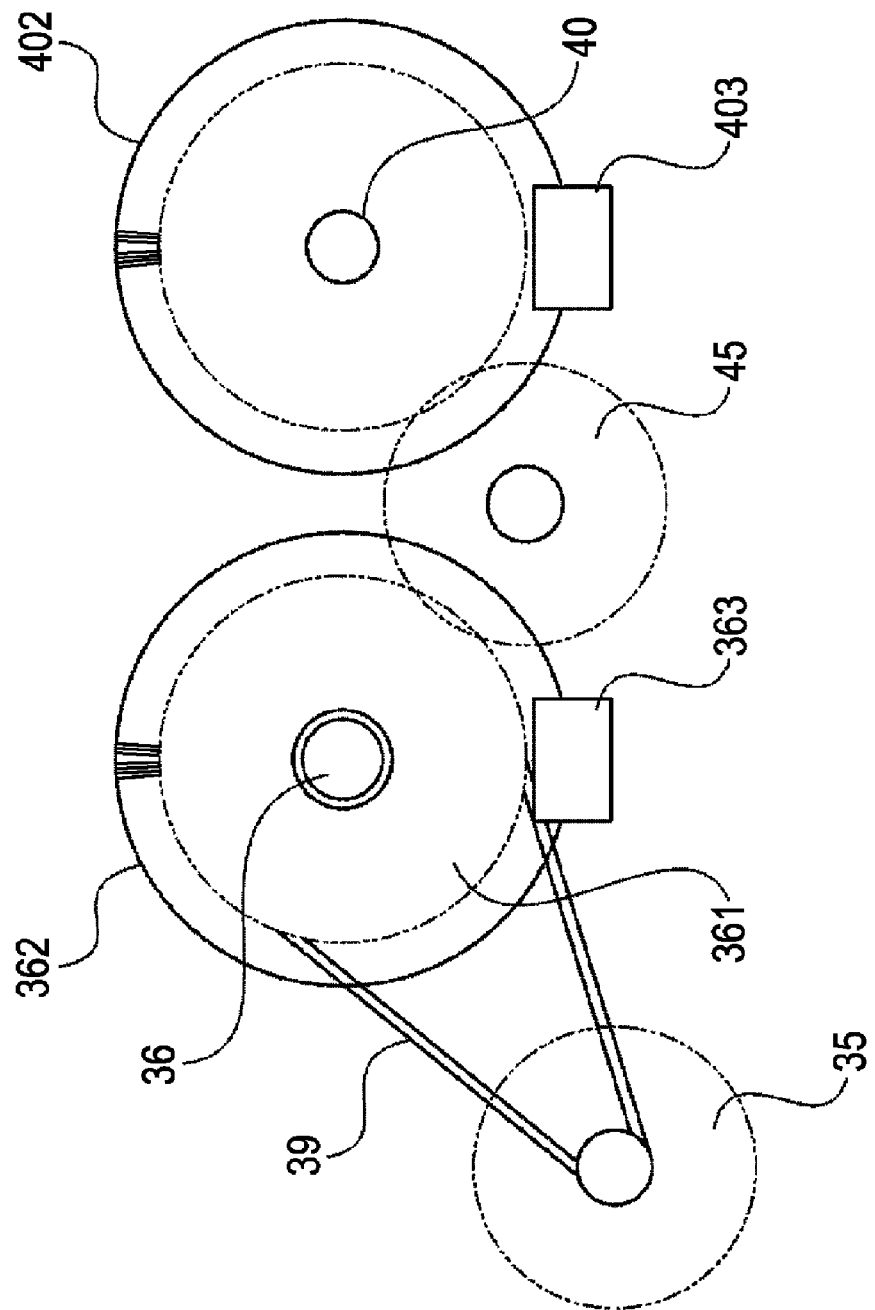
FIG. 3 is a cross-sectional view of conveying mechanisms of the recording apparatus according to an embodiment of the present invention.

FIG. 3 is a cross-sectional view of the conveying mechanisms of the recording apparatus. The driving force of a DC motor 35 is transmitted to a pulley 361 disposed on the shaft of the conveying roller 36 via a timing belt 39 so as to drive the conveying roller 36.

Moreover, a code wheel 362 used for detecting the conveying amount by the conveying roller 36 is disposed on the shaft of the conveying roller 36. An encoder sensor 363 for reading out marks on the code wheel 362 is disposed on a chassis adjacent to the code wheel 362. In FIG. 3, the sheet is conveyed from left to right.

The drive of the conveying roller 36 is transmitted to the eject roller 40 via an idler gear 45. A code wheel 402 used for detecting the conveying amount by the eject roller 40 is disposed on the shaft of the eject roller 40, and an encoder sensor 403 for reading out marks on the code wheel 402 is disposed on the chassis adjacent to the code wheel 402.

Figure 11:
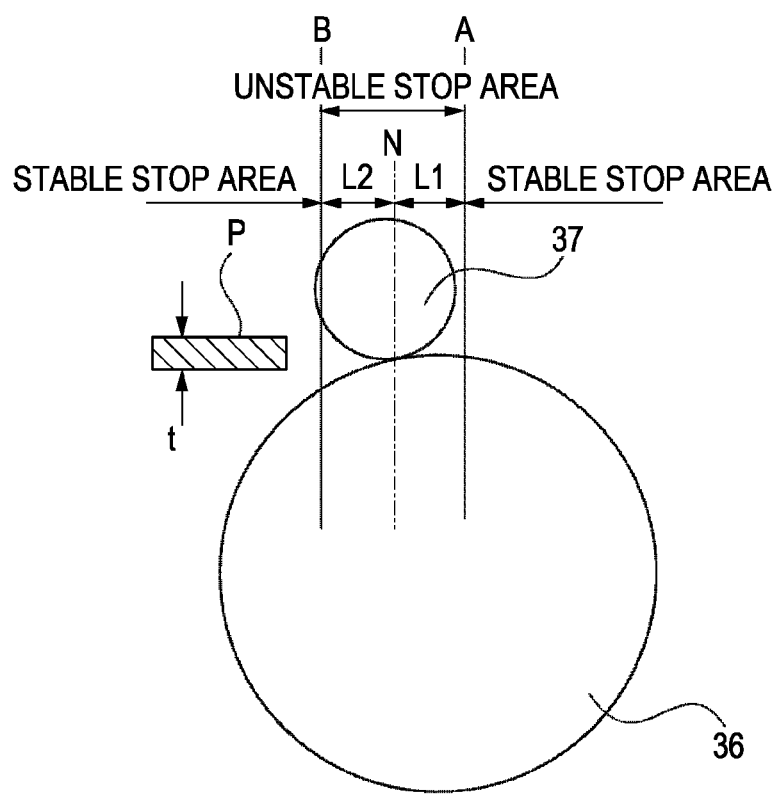
FIG. 11 illustrates a state where a conveying operation is stopped according to an embodiment of the present invention.

As shown in FIG. 11, the conveying roller 36 and a pinch roller 37 form a nip line N. A position A is located upstream of the nip line in the conveying direction, and is separated from the nip line by a distance L1. A position B is located downstream of the nip line in the conveying direction, and separated from the nip line by a distance L2. The distances L1 and L2 are determined in accordance with the diameters, materials, and positions of the conveying roller 36 and the pinch roller 37, the thickness of the sheet, and the like. Herein, the position A is a downstream boundary of an area where the sheet can stably stop when the trailing end of the sheet stops in this area. On the other hand, the position B is a downstream boundary of an area where the sheet cannot stably stop.

Figure 4:
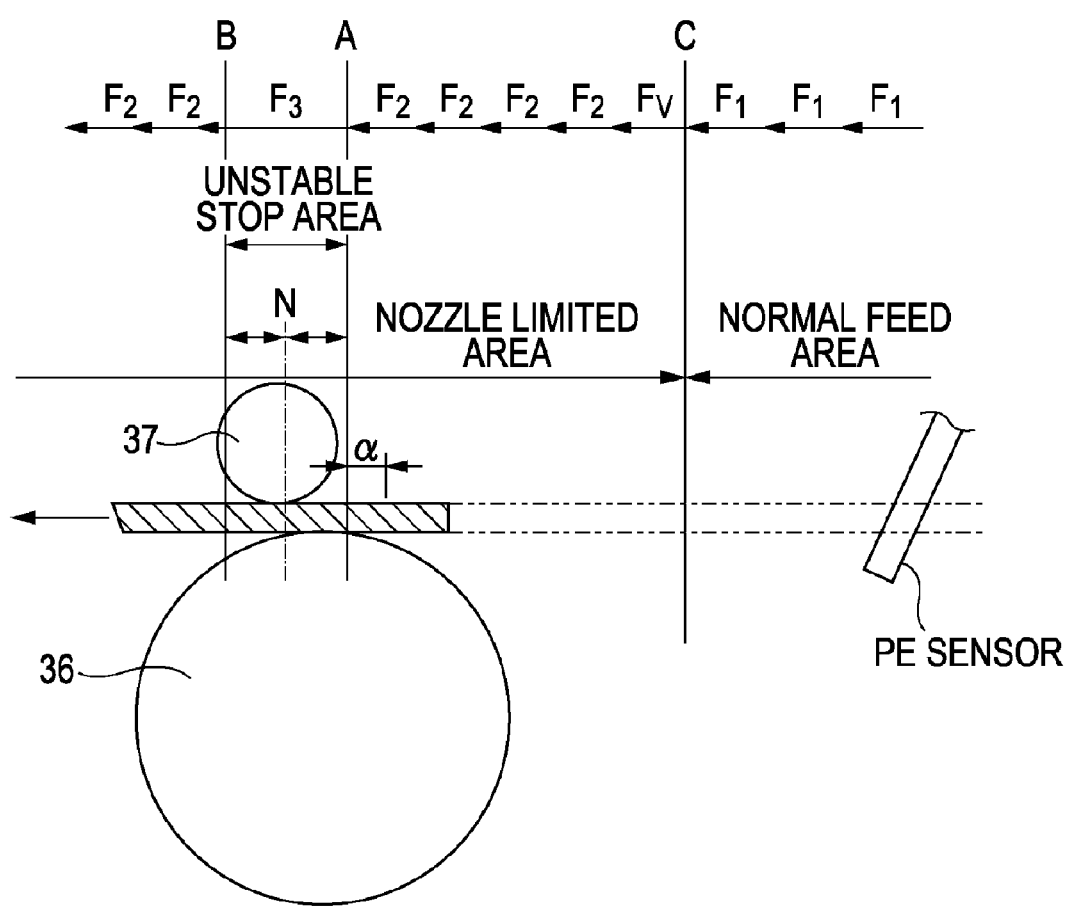
FIG. 4 illustrates a sequence of conveyance control according to an embodiment of the present invention.

Next, FIG. 4 illustrates a flow of a conveying sequence before and after a sheet passes through the conveying roller. FIG. 4 illustrates a one-pass recording mode in which the recording head scans over a predetermined area on a sheet only one time so as to form an image in the predetermined area.

Figure 9:
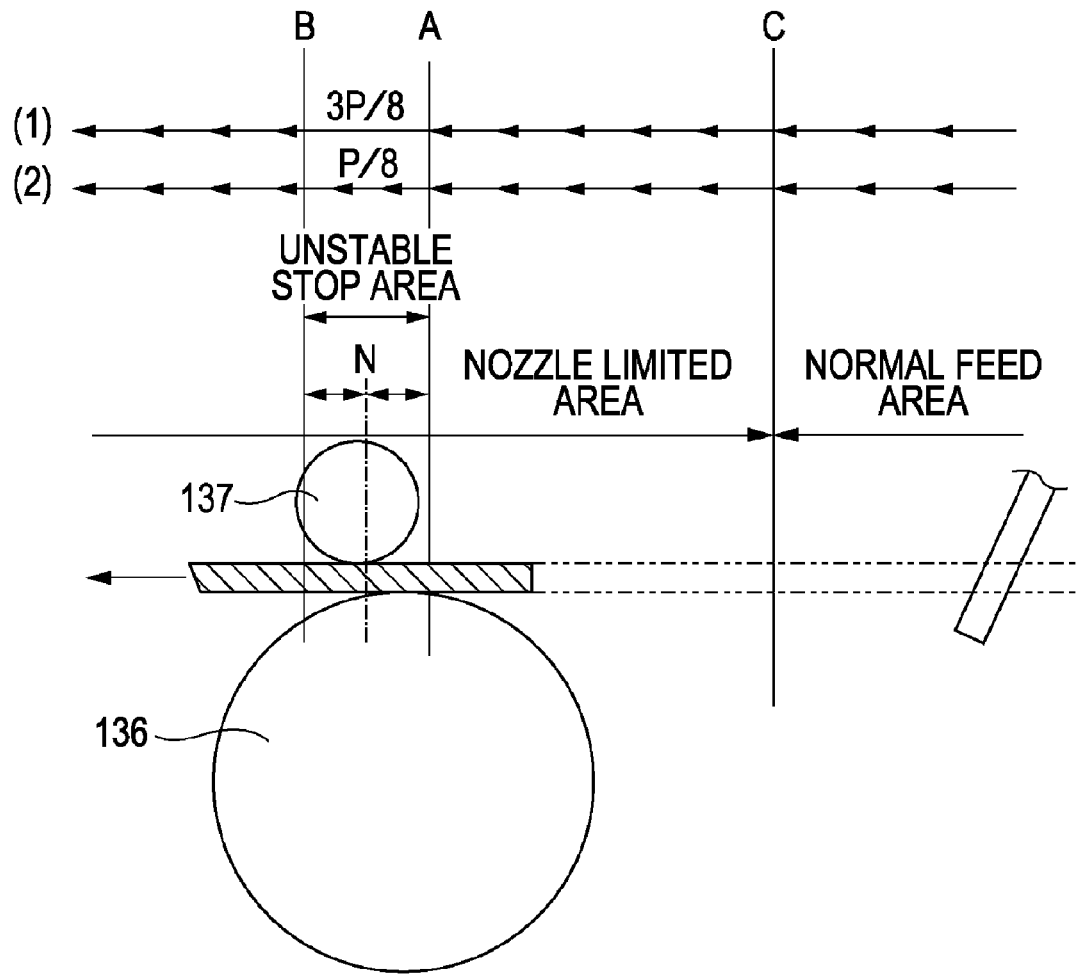
FIG. 9 illustrates sequences of conveyance control according to a known technology.

FIG. 4 shows positions of the trailing end of the sheet on a conveying path and conveying amounts of the sheet during conveying operations. As in FIG. 9, each arrow indicates one conveying operation. Marks $F_1$, $F_2$, and $F_3$ indicate conveying operations by predetermined conveying amounts. In FIG. 4, a control unit changes the conveying amount for every conveying operation such that the trailing end of the sheet stops in areas other than the unstable stop area (between the positions A and B).

In FIG. 4, the conveying operation $F_1$ is performed in a normal feed area. When the conveying operation $F_1$ is performed two more times after a page end (PE) sensor detects the trailing end of the sheet, the trailing end of the sheet reaches a position C. The position C is a predetermined position on the conveying path. When the trailing end of the sheet reaches the position C or a position downstream of the position C in the conveying direction, the control unit performs the conveying operation $F_v$ on the basis of the distance between the position A and the position of the trailing end of the sheet.

This conveying operation $F_v$ allows the trailing end of the sheet to reliably stop in a predetermined area (predetermined range) on the conveying path having a width α located upstream of the position A in the conveying direction after the subsequent conveying operation $F_2$ is performed four times (FIG. 4).

When the trailing end of the sheet stops in this predetermined area (predetermined range), the trailing end of the sheet can pass through the unstable stop area and can stop in a stable stop area located downstream of the position B by conveying the sheet by a conveying amount corresponding to the distance AB+α.

Thus, the conveying operation is controlled by, for example, controlling the distance from the position of the trailing end of the sheet to the position A using the information of the encoder after the PE sensor detects the trailing end of the sheet.

Figure 12:
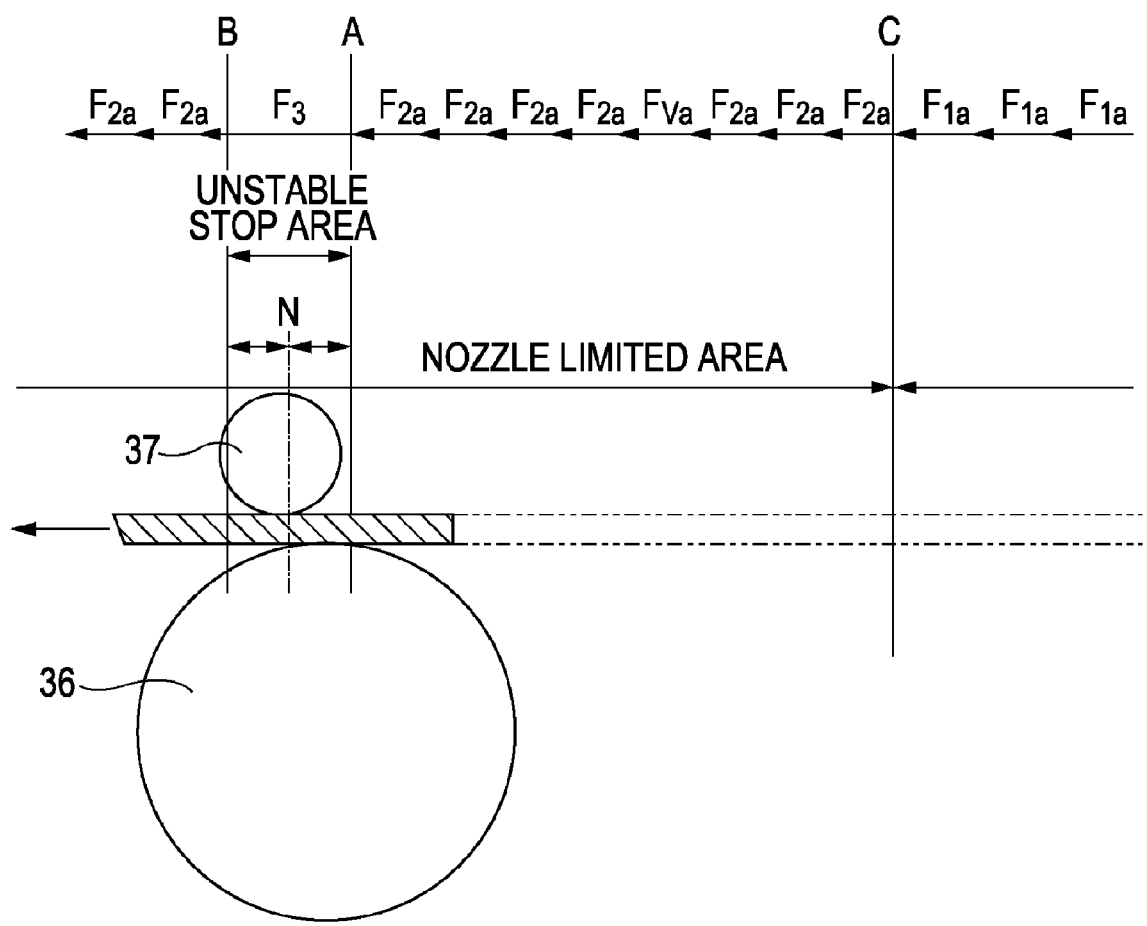
FIG. 12 illustrates another sequence of the conveyance control according to an embodiment of the present invention.

The conveying sequence is not limited to that shown in FIG. 4. Another conveying sequence will now be described with reference to FIG. 12. FIG. 12 illustrates a three-pass recording mode in which the recording head scans over a predetermined area on a sheet three times so as to form an image in the predetermined area. Conveying operations performed in the three-pass mode are represented as $F_{1a}$, $F_{2a}$, and $F_{va}$ so as to be distinguishable from those in the one-pass mode.

When the trailing end of the sheet that has been conveyed during the conveying operations $F_{1a}$ reaches the position C (or a position downstream of the position C in the conveying direction (left side)), the conveying operation $F_{2a}$ is performed three times, and then the conveying operation $F_{va}$ is performed one time. The number of executions of the conveying operation $F_{2a}$ corresponds to the number of times scanning is performed by the recording head in the recording mode, i.e., three herein. Therefore, the number of executions of the conveying operation in this area becomes four in a four-pass recording mode.

The number of nozzles used for a scan (or the number of times scanning is performed over a predetermined area on the sheet) and the above-described information on the conveying amount by which the sheet is conveyed during one conveying operation for each recording mode are retained in a memory of the recording apparatus. A CPU 100 controls the recording operation and the conveying operation on the basis of the recording mode. Thus, the trailing end of the sheet can pass through the unstable stop area regardless of the recording mode.

Figure 5:
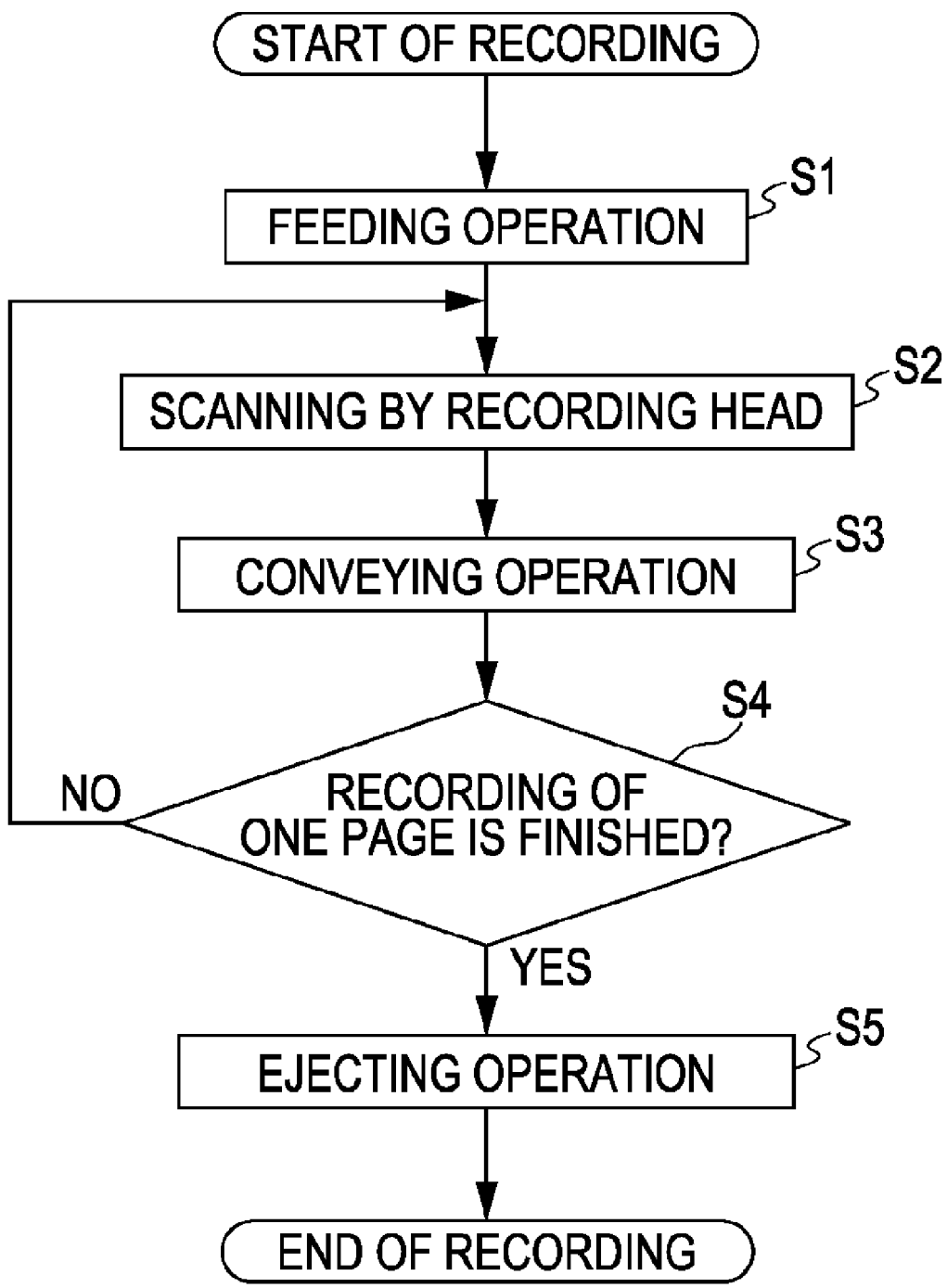
FIG. 5 is a control flow of a recording operation according to an embodiment of the present invention.

FIG. 5 is a control flow of recording on a sheet in the recording apparatus. A sheet is fed in Step S1, and the recording head scans over the sheet in Step S2. The sheet is conveyed in Step S3. In Step S4, it is determined whether or not a recording of one page is finished. For example, it is determined whether or not all the data sent from a host is recorded. When it is determined that the recording of one page is finished, the process proceeds to Step S5. On the other hand, when it is determined that the recording is not finished, the process returns to Step S2. The sheet is ejected in Step S5.

Figure 6:
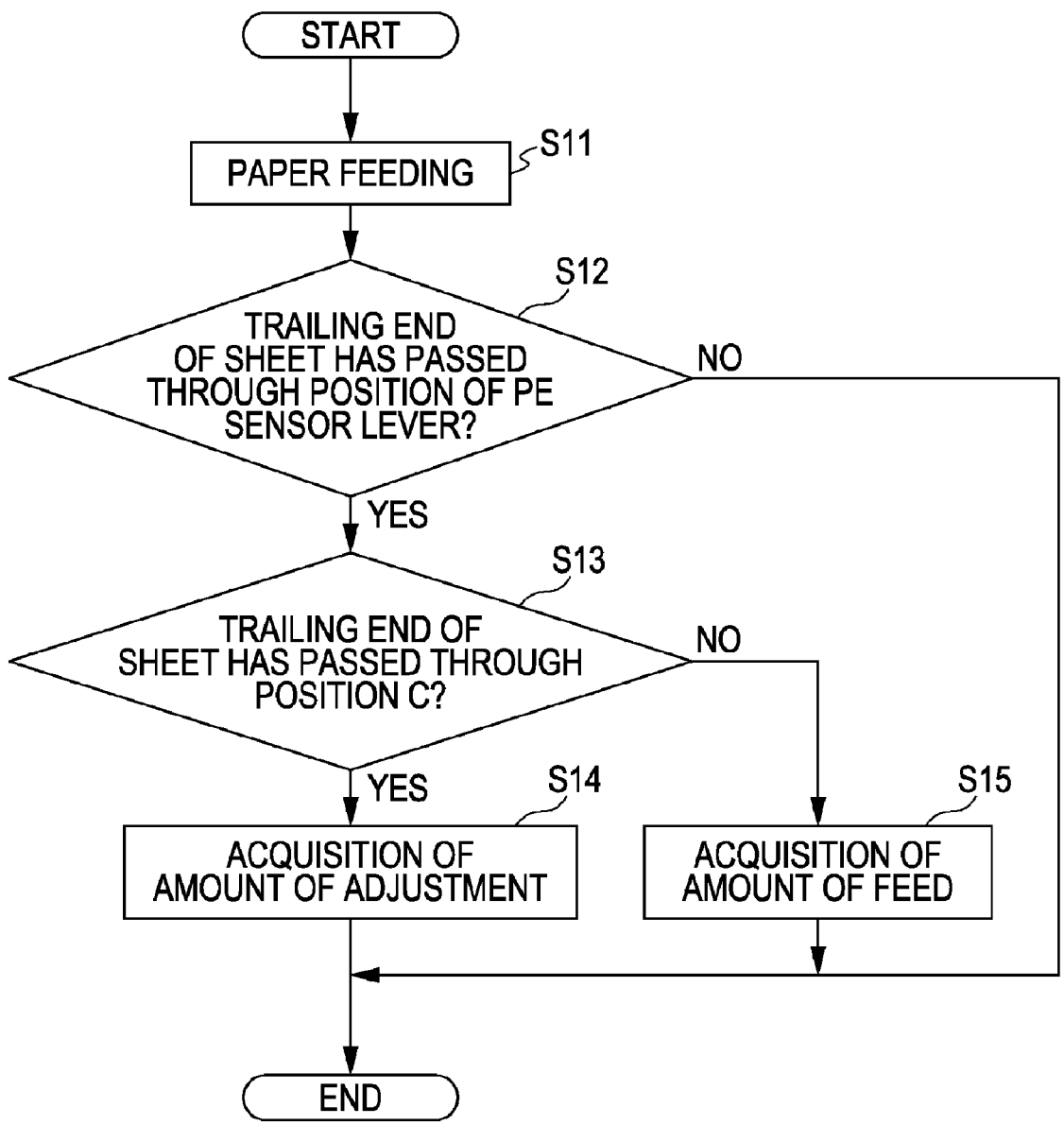
FIG. 6 is a control flow of a conveying operation according to an embodiment of the present invention.

FIG. 6 is a control flow of a conveying operation performed by the recording apparatus. This flow is conducted for every conveying operation. Herein, the conveying operation $F_1$ is performed at the beginning. In order to simplify explanation, the process of scanning performed by the recording head is omitted. The sheet is conveyed in Step S11. When FIG. 4 is taken for instance, the conveying operation performed in Step S11 can be selected from any of $F_2$, $F_3$, and $F_v$ instead of $F_1$. In Step S12, it is determined whether or not the trailing end of the sheet has passed through the position of the PE sensor lever. When it is determined that the trailing end of the sheet has passed through the position of the PE sensor lever in Step S12, the process proceeds to Step S13. The conveying operation $F_1$ is performed until it is determined that the trailing end of the sheet has passed through the position of the PE sensor lever in Step S12, and the process ends without performing Step S13 or later. When it is necessary to acquire the position of the trailing end of the sheet on the conveying path, the encoder provided for the conveying roller can be used.

In Step S13, it is determined whether or not the trailing end of the sheet has passed through the position C by the conducted conveying operation as shown in FIG. 4 on the basis of the information on the position of the trailing end of the sheet. When it is determined that the trailing end of the sheet has passed through the position C, the process proceeds to Step S14. In Step S14, the conveying amount during the conveying operation $F_v$ is acquired. The process in Step S14 is performed only one time while a sheet is conveyed. After the conveying operation $F_v$ is performed one time, the process proceeds to Step S15 regardless of the position of the trailing end of the sheet. In Step S13, it can be further determined whether or not the conveying operation $F_v$ has been performed.

On the other hand, when it is determined that the trailing end of the sheet has not passed through the position C or the conveying operation $F_v$ has been performed in Step S13, the process proceeds to Step S15. In Step S15, the conveying amount is acquired on the basis of the information on the position of the trailing end of the sheet.

In Step S14, the distance from the position of the trailing end of the sheet to the position A is divided by a line feed amount Q, and the conveying amount during the conveying operation $F_v$ is determined on the basis of the remainder. Instead of the above-described method in which arithmetic processing is performed, a table of information on conveying amounts can be prepared in advance. Specifically, a table of conveying amounts during the conveying operation $F_v$ based on the distances from the positions of the trailing end of the sheet to the position A and the line feed amount Q is retained in the memory in advance. The value of the conveying amount can be acquired from this table on the basis of the information on the distance from the position of the trailing end of the sheet to the position A.

As described above, the CPU 100 controls the conveying amount and the nozzles of the recording head to be used on the basis of the information on the position of the trailing end of the sheet or on the distance from the position of the trailing end of the sheet to the position A. In order to realize the above-described control, a table of conveying amounts during the conveying operations $F_1$, $F_2$, $F_3$, and $F_v$ corresponding to the information on the positions of the trailing end of the sheet and a table of information on the number and positions of the nozzles used for recording, for example, can be prepared.

Figure 7:
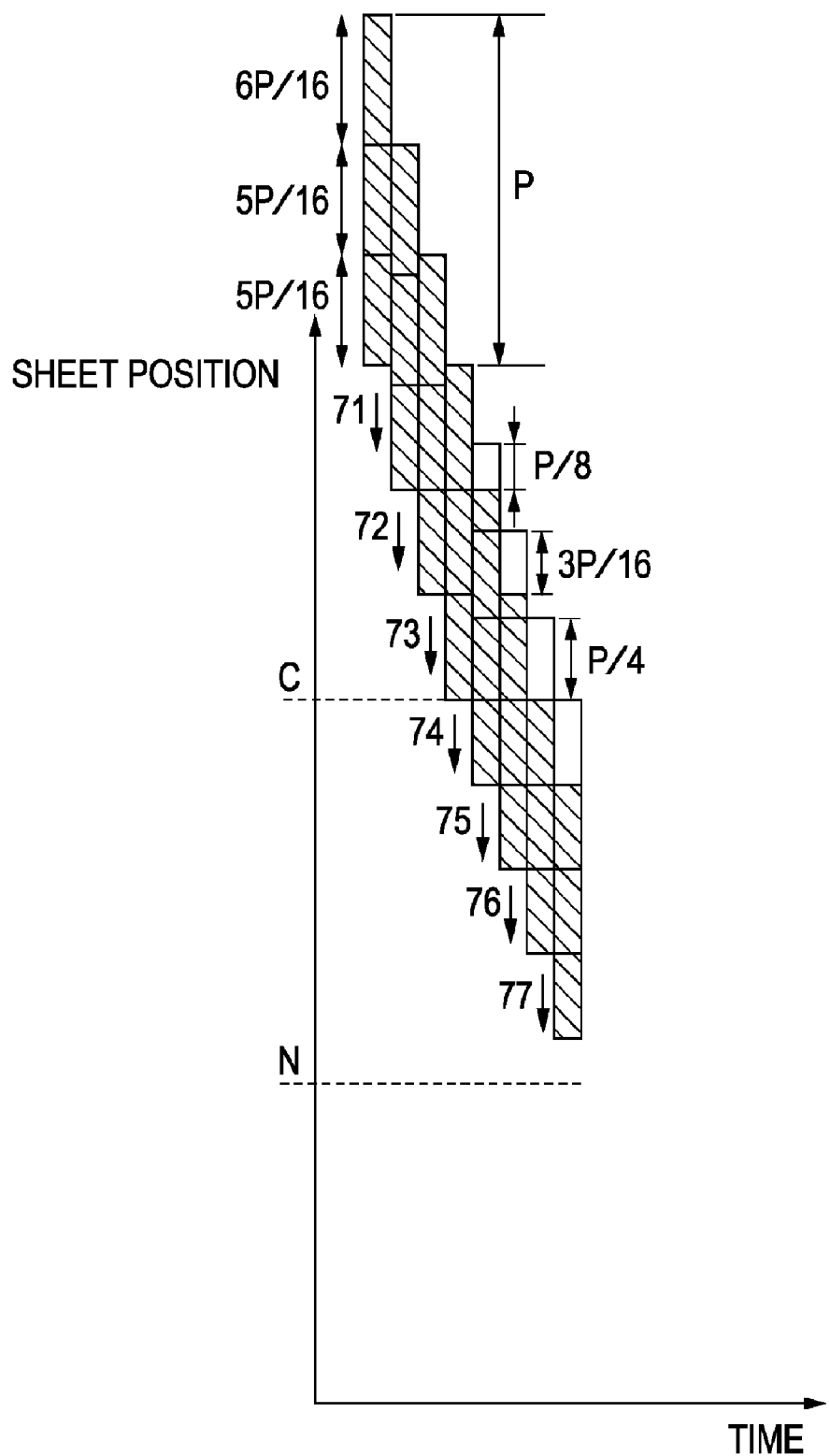
FIG. 7 illustrates areas of nozzles of a recording head used for recording and conveying amounts of a sheet according to an embodiment of the present invention.

FIG. 7 is a conceptual diagram illustrating the relationship among the position of the trailing end of the sheet on the conveying path, the conveying amount during a conveying operation, which are described with reference to FIGS. 4 and 12, and the number of nozzles of the recording head (nozzle row) to be used when a multi-pass recording is performed. FIG. 7 illustrates the relative positional relationship between the sheet and the recording head. In the actual apparatus, the sheet is moved in the conveying direction, i.e., the recording head is not moved in the conveying direction. However, it is assumed that the position of the recording head is changed in the conveying direction in FIG. 7 for ease of explanation.

In FIG. 7, the length of the nozzle row of the recording head (or the number of nozzles in the nozzle row) is defined as P. The slender rectangles each indicate a nozzle row. Herein, the rectangles are sectioned into three or four blocks. The shaded areas indicate areas in use, and unshaded areas indicate unused areas. Lower portions of the rectangles are located downstream in the conveying direction, and upper portions of the rectangles are located upstream in the conveying direction.

In FIG. 7, a three-pass recording is performed. At first, all the nozzles are used for recording. However, the number of unused nozzles is increased to P/8, 3P/16, or P/4 as the recording operation proceeds. This is because the positions of the nozzles to be used are shifted when a recording is made on the trailing end portion of the sheet.

Numbers 71 to 77 each indicate a conveying operation, and the conveying operations 71 to 77 are performed in order.

Moreover, the conveying amounts during the conveying operations 71 to 73 are set to 6P/16 or 5P/16. That is, when the conveying amounts during the three conveying operations 71 to 73 are 6P/16, 5P/16, and 5P/16, respectively, the total conveying amount becomes equal to the length P of the nozzle row.

As described above, after the trailing end of the sheet is detected by the PE sensor, the number of nozzles used for recording is reduced in accordance with the progress of the sheet.

In an exemplary embodiment, the number of nozzles in the nozzle row is 512, for example. When the number of nozzles to be used is limited to ¾, the number of nozzles to be used becomes 384.

In the three-pass recording, the conveying amount during one conveying operation in an area where the number of nozzles is limited (nozzle limited area) becomes P/4 (=128 nozzles).

The conveying amounts during the conveying operations 71 to 73 each correspond to that during the conveying operation $F_{1a}$ shown in FIG. 12. The conveying amount of P/4 during the conveying operations 74 to 77 corresponds to that during the conveying operation $F_{2a}$ shown in FIG. 12. In this manner, the conveying amounts in an exemplary embodiment can be increased as compared with that of P/8 during the conveying operation in the known technology described above. In FIG. 7, the conveying amount during the conveying operation $F_{va}$ (described below) is set to P/4.

Figure 8:
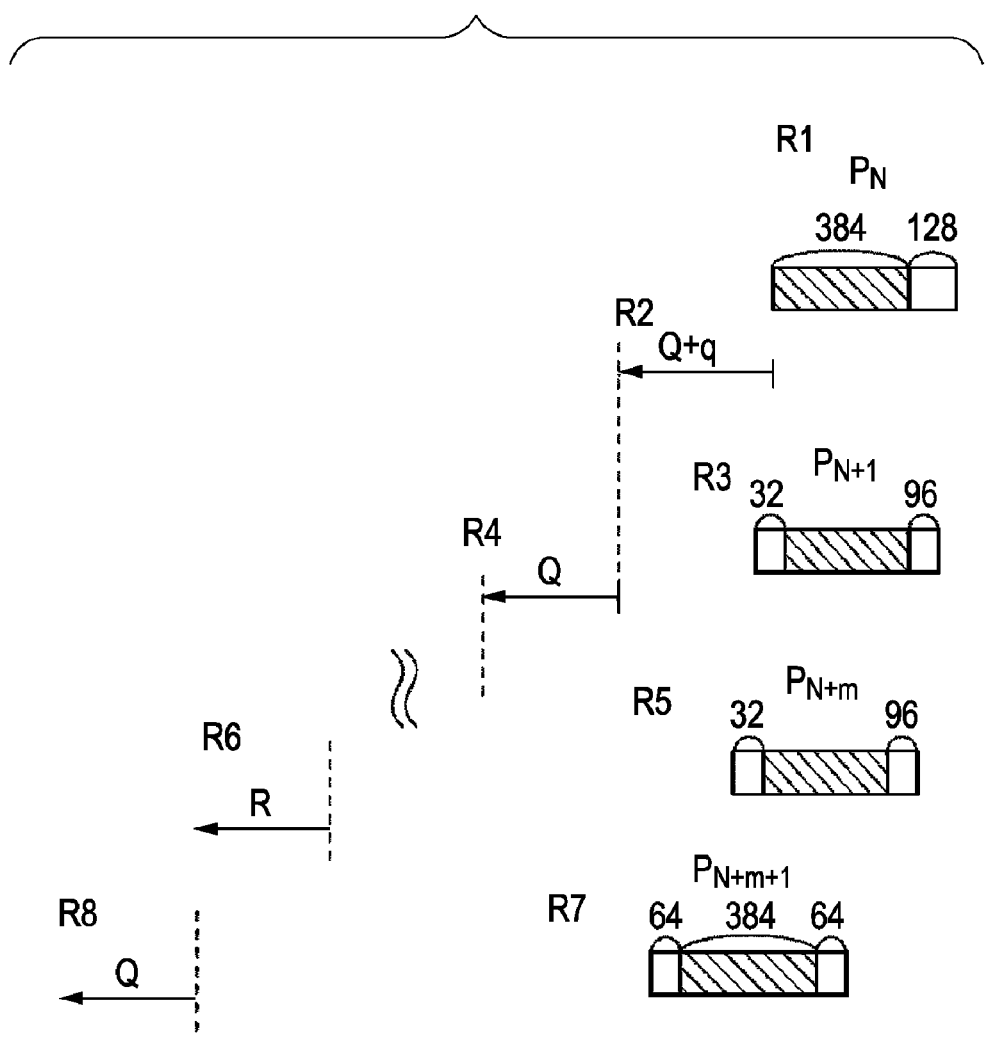
FIG. 8 illustrates the areas of nozzles of the recording head used for recording and the conveying amounts of the sheet according to an embodiment of the present invention.

FIG. 8 illustrates the conveying amounts before and after the trailing end of the sheet passes through the unstable stop area and the nozzles of the recording head to be used in the one-pass recording mode.

The processes shown in FIG. 8 proceed from top to bottom. The recording operation on the sheet will be described from the middle of the flow for ease of explanation. Herein, for example, processes after the trailing end of the sheet reaches the position C on the conveying path shown in FIG. 4 will be described. A sequence of the recording operations and the conveying operations is described. This sequence is performed from Process R1 in order.

First, a recording operation using the first to three hundred eighty-fourth nozzles in the nozzle row downstream in the conveying direction is performed (Process R1). A mark $P_N$ indicates Nth scanning by the recording head over the sheet. Next, a conveying operation by a conveying amount of Q+q is performed (Process R2). This conveying operation corresponds to the conveying operation $F_v$ shown in FIG. 4, and the conveying amount during this conveying operation corresponds to the length of 416 nozzles. Next, a recording operation using 384 nozzles from the thirty-third nozzle in the nozzle row downstream in the conveying direction is performed (Process R3). The number of nozzles to be used is not changed. However, the nozzles to be used are changed. A mark $P_{N+1}$ indicates (N+1)th scanning by the recording head.

Next, a conveying operation by a conveying amount of Q is performed (Process R4). This conveying operation corresponds to the conveying operation $F_2$ shown in FIG. 4, and the conveying amount during this conveying operation corresponds to the length of 384 nozzles. After this, the recording operation using the 384 nozzles from the thirty-third nozzle and the conveying operation by the conveying amount of Q are repeated. Subsequently, the recording operation using the 384 nozzles from the thirty-third nozzle is performed ((N+m)th scanning; Process R5). Next, a conveying operation by a conveying amount of R is performed (Process R6). This conveying operation corresponds to the conveying operation $F_3$ shown in FIG. 4. Next, a recording operation using 384 nozzles from the sixty-fifth nozzle in the nozzle row downstream in the conveying direction is performed (Process R7). Since the conveying amount of R is larger than that during the conveying operation $F_2$, the difference is adjusted by changing the nozzles to be used for recording.

As a postscript, the position of the trailing end of the sheet is detected and the information on the distance from the position of the trailing end of the sheet to the position of the conveying roller 36 is acquired every conveying operation. The subsequent conveying operation is performed using the conveying amount based on the acquired information on the distance.

In FIG. 8, the one-pass recording mode is described, and the number of nozzles to be used is 384. In a three-pass recording mode, one third of 384 nozzles, i.e., 128 nozzles are used for recording. Moreover, the conveying amount during the conveying operation $F_{2a}$ becomes the length corresponding to 128 nozzles, and the conveying amount during the conveying operation $F_{va}$ becomes the length corresponding to 160 nozzles (=128+32).

In this exemplary embodiment, the conveying amounts are selected from any of Q, Q+q, Q+2q, and Q+3q on the basis of the distance to the conveying roller 36 (or distance to the position A shown in FIG. 4). As described with reference to FIG. 6, the distance is divided by the line feed amount Q so as to determine the remainder. The conveying amount during the conveying operation $F_v$ is determined from this remainder in units of q=Q/4, for example. The conveying amounts can be determined from a table of conveying amounts corresponding to the distances from the positions where (the trailing end of) a recording sheet stops to the position of the conveying roller 36.

The position of the trailing end of the recording sheet when the conveying operation $F_3$ is started can be controlled by adjusting the conveying amount during the conveying operation $F_v$. With this, the trailing end of the recording sheet can be reliably prevented from stopping in the unstable stop area.

Next, the above-described control flow will be briefly described. First, when the trailing end of a sheet that is being conveyed is detected by the PE sensor, the number of nozzles to be used is gradually reduced for every recording operation while the recording operations and the conveying operations are performed (for example, the number of nozzles to be used is gradually reduced to 384). After the number of nozzles is reduced to a desired value, a conveying amount during an adjustment feed is acquired on the basis of the distance from the position where (the trailing end of) the recording sheet stops to the position of the conveying roller 36. Subsequently, the conveying operation $F_v$ (adjustment feed by the conveying amount of Q+q; see Process R2 in FIG. 8) is performed on the basis of the acquired conveying amount (for example, one time). After this, the conveying operation $F_2$ by a conveying amount corresponding to the number of nozzles to be used (384; conveying amount of Q; see Process R4 in FIG. 8) is performed. However, when the conveying operation for passing through the nip formed by the conveying roller 36 is required, the conveying operation $F_3$ (conveying amount of R; see Process R6 in FIG. 8) is performed. The recording operation after the conveying operation $F_3$ is performed by changing the positions of nozzles to be used (see Process R7 in FIG. 8). After this, the conveying operation $F_2$ (conveying amount of Q; see Process R8 in FIG. 8) by the conveying amount corresponding to the number of nozzles to be used (384) and the recording operation using the nozzles shown in Process R7 in FIG. 8 are performed. In this manner, the control of the conveying amount and the selection of the nozzles to be used are performed after the trailing end of the sheet is detected by the PE sensor.

Figure 10:
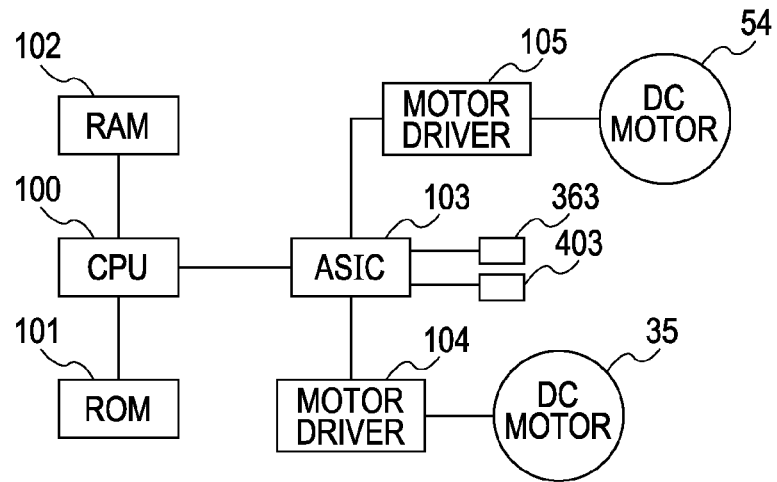
FIG. 10 is a control block diagram of the recording apparatus according to an embodiment of the present invention.

FIG. 10 is a control block diagram of the recording apparatus according to this exemplary embodiment. The CPU 100 executes control programs stored in a ROM 101, and performs the programs in accordance with, for example, the control flows shown in FIGS. 5 and 6. Moreover, the ROM 101 also stores the above-described data of the conveying amounts. A RAM 102 is a working memory. A motor driver 104 drives the DC motor 35. A motor driver 105 drives a DC motor 54. An ASIC 103 processes information output from the encoder sensors 363 and 403. The conveying operations are performed by controlling the DC motor 35.

According to the above-described structure, it is not necessary to reduce the conveying amount of a sheet in the nozzle limited area and the number of nozzles to be used beyond necessity. Therefore, throughput during the recording operations can be increased.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2006-226701 filed Aug. 23, 2006, which is hereby incorporated by reference herein in its entirety.

What is claimed is:

1. A recording apparatus for forming images using a recording head scanning over a predetermined area on a sheet N times, the recording apparatus comprising:

a feeding roller configured to convey the sheet disposed on a stacking unit;

a conveying roller configured to further convey the sheet fed by the feeding roller;

a conveyance control unit configured to control drive of the conveying roller each time scanning is performed by the recording head; and a recording control unit configured to control a first recording in which the scanning is performed N times by selecting recording elements of the recording head until a trailing end of the sheet reaches a predetermined position defined between the feeding roller and the conveying roller, and configured to control a second recording in which the scanning is performed N times using a part of the recording elements of the recording head after the trailing end of the sheet reaches the predetermined position, wherein the conveyance control unit performs a conveying operation a number of times based on the value of N after the trailing end of the sheet reaches the predetermined position such that the trailing end of the sheet is disposed in a first range remote from and upstream of the conveying roller in a direction in which the sheet is conveyed after the conveying operations, and wherein at least one of the conveying operations performed a number of times based on the value of N is performed based on a distance from a position of the trailing end of the sheet to the position of the conveying roller.

2. The recording apparatus according to claim 1, further comprising a detection unit disposed between the feeding roller and the conveying roller on a conveying path and configured to detect the trailing end of the sheet.

3. The recording apparatus according to claim 1, wherein the trailing end of the sheet is conveyed to a second range downstream of the conveying roller in the direction in which the sheet is conveyed by a conveying operation performed after the trailing end of the sheet is disposed in the first range.

4. A method for controlling a recording apparatus for forming images using a recording head scanning over a predetermined area on a sheet N times, the recording apparatus including a feeding roller configured to convey the sheet disposed on a stacking unit and a conveying roller configured to further convey the sheet fed by the feeding roller, the method comprising:

controlling drive of the conveying roller each time scanning is performed by the recording head; and controlling a first recording in which the scanning is performed N times by selecting recording elements of the recording head until a trailing end of the sheet reaches a predetermined position defined between the feeding roller and the conveying roller, and controlling a second recording in which the scanning is performed N times using a part of the recording elements of the recording head after the trailing end of the sheet reaches the predetermined position, wherein the drive of the conveying roller is controlled so as to perform a conveying operation a number of times based on the value of N after the trailing end of the sheet reaches the predetermined position such that the trailing end of the sheet is disposed in a first range including the position of the conveying roller and upstream of the conveying roller in a direction in which the sheet is conveyed after the conveying operations, and wherein at least one of the conveying operations performed a number of times based on the value of N is performed based on a distance from a position of the trailing end of the sheet to the position of the conveying roller.

* * * * *